(12) United States Patent
Sokolov et al.

(10) Patent No.: US 7,572,424 B1
(45) Date of Patent: Aug. 11, 2009

(54) SELF-ASSEMBLY OF NANOPOROUS SILICA FIBERS OF UNIFORM SHAPE

(75) Inventors: Igor Sokolov, Potsdam, NY (US); Yaroslav Kievsky, Potsdam, NY (US)

(73) Assignee: Clarkson University, Potsdam, NY (US)

( * ) Notice: Subject to any disclaimer, the term of this patent is extended or adjusted under 35 U.S.C. 154(b) by 231 days.

(21) Appl. No.: 11/288,974

(22) Filed: Nov. 29, 2005

Related U.S. Application Data

(60) Provisional application No. 60/631,224, filed on Nov. 29, 2004.

(51) Int. Cl.
*C01B 33/12* (2006.01)
*D02G 3/00* (2006.01)
(52) U.S. Cl. .................. 423/339; 423/335; 428/364
(58) Field of Classification Search ............... 423/324, 423/325, 335–340; 977/734, 773, 762; 428/364
See application file for complete search history.

(56) References Cited

U.S. PATENT DOCUMENTS

| 5,211,934 | A | 5/1993 | Kresge et al. ............ 423/706 |
| 2003/0152759 | A1* | 8/2003 | Chao et al. .............. 428/307.3 |

OTHER PUBLICATIONS

Yang et al. "Free-standing and oriented mesoporous silica films grown at the air-water interface", Nature; Jun. 13, 1996; 381, 6583, p. 589.*

Yang et al. "The Role of Defects in the Formation of Mesoporous Silica Fibers, Films, and Curved Shapes", Advanced Materials 1998, 10, No. 11. pp. 883-.*

Schmidt-Winkel et al. "Fluoride-Induced Hierarchical Ordering of Mesoporous Silica in Aqueous Acid-Syntheses", Advanced Materials 1999, 11, No. 4. pp. 303-306.*

Zhao et al. "Triblock Copolymer Syntheses of Mesoporous Silica with Periodic 50-300 Angstrom Pores", Science 279, 548 (1998), pp. 548-.*

Yang et al. "Morphogenesis of shapes and surface patterns in mesoporous silica", Nature 386, Apr. 17, 1997, pp. 692-695.*

Y. Kievsky and I. Sokolov, Self Assembly of Uniform Nanoporous Silica, IEEE Transactions on Nanotechnology, v.4 (5), p. 490-494, entire article.

H. Yang, G.A. Ozin, "Morphogenesis of shapes and surface patterns in mesoporous silica," Nature, vol. 386, pp. 692-695, 1997.

"Ordered Mesoporous Molecular Sieves Synthesized by a Liquid-Crystal Template Mechanism"C. T. Kresge, M. E. Leonowicz, W. J. Roth, J.C. Vartuli, J. S. Beck, Naturvol. 359, pp. 710-712,(1992).

* cited by examiner

*Primary Examiner*—Steven Bos
*Assistant Examiner*—Anthony J Zimmer
(74) *Attorney, Agent, or Firm*—Gerow D. Brill

(57) ABSTRACT

This disclosure describes a self-assembly templating of a cationic surfactant in the presence of a silica precursor that is free of an excessive variability of the assembled shapes and has a yield approaching one hundred percent. This disclosure describes a self-assembly process that includes cooling and keeping a resultant solution at cold temperatures during the synthesis.

18 Claims, 7 Drawing Sheets

Horizontal bar is 5μm

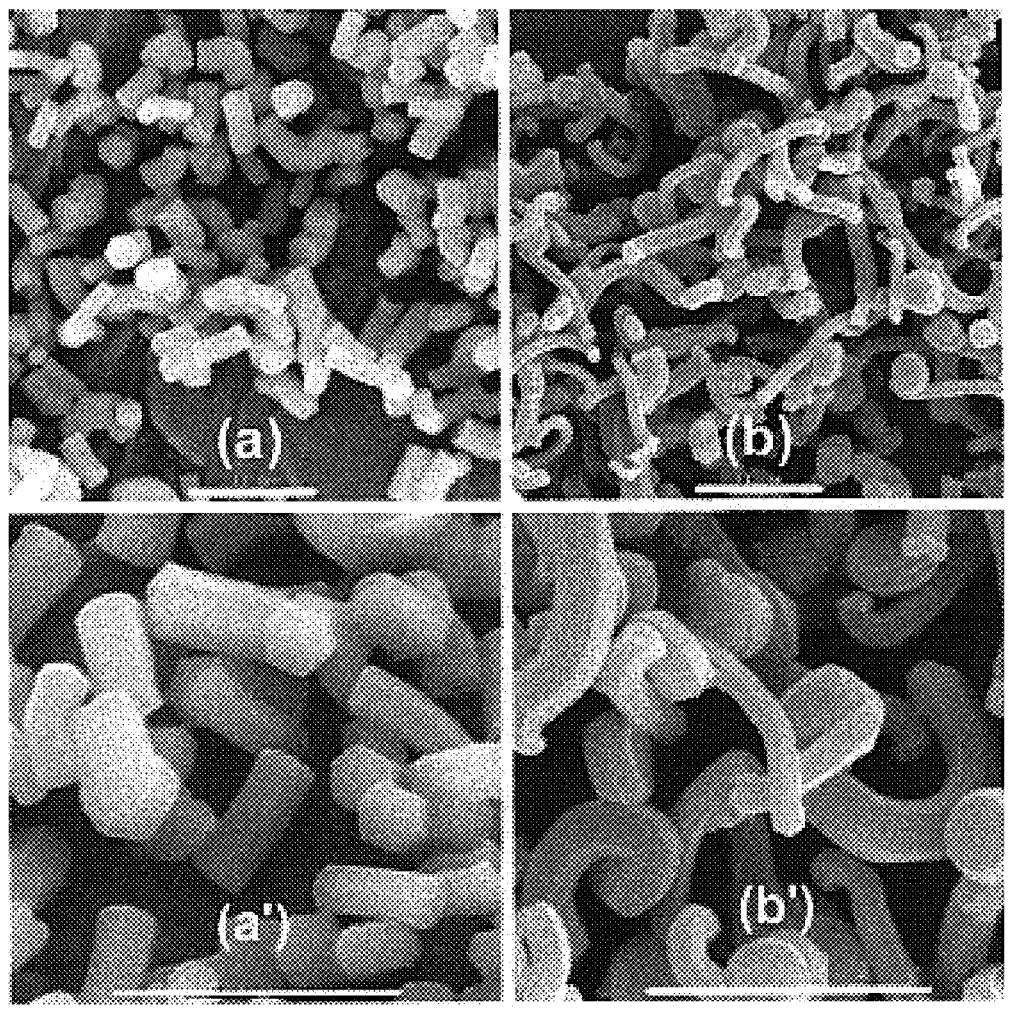
Figures 1a, 1a', 1b, and 1b'
Horizontal bar is 11μm 2a 2a'
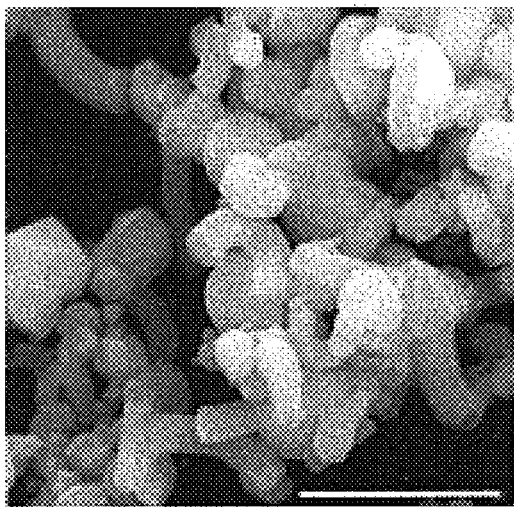 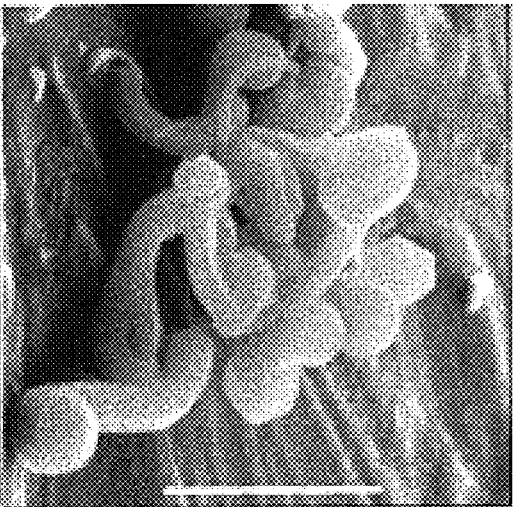
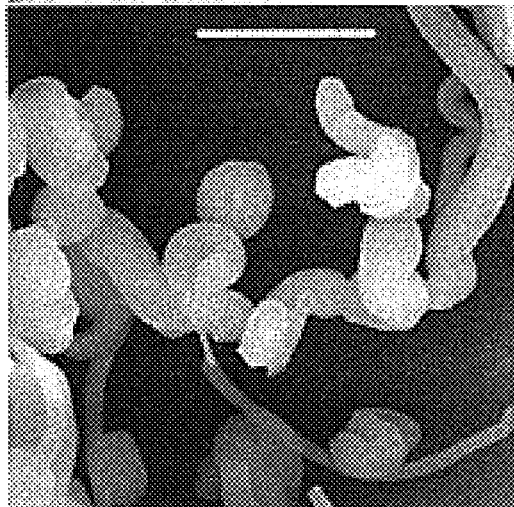 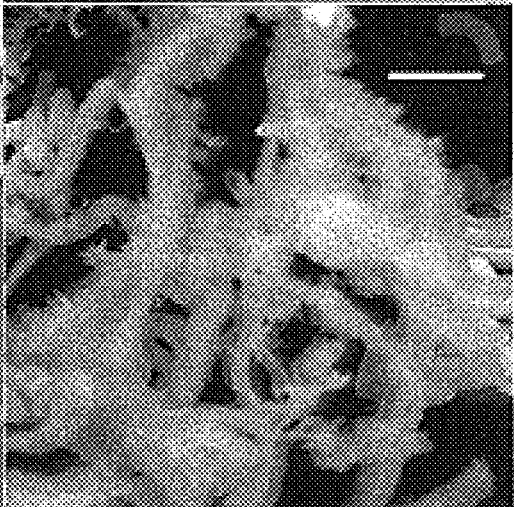
2b 2b'
Figures 2a, 2a, 2b and 2b'
The horizontal bar is 10μm Horizontal bar is 5μm

SELF-ASSEMBLY OF NANOPOROUS SILICA FIBERS OF UNIFORM SHAPE

CROSS REFERENCES

This application is related to Provisional Patent Application 60/631,224 filed on Nov. 29, 2004 entitled "Self-Assembly of Nanoporous Silica Fibers of Uniform Shape" and is hereby incorporated by reference.

FIELD OF INVENTION

The present invention is related to the self-assembly of nanoporous silica fibers of uniform shape, in particular a method having an improved yield and improved size distribution of the fibers.

BACKGROUND OF THE INVENTION

Existing Technologies and Problem Description

With the discovery of the liquid crystal templating of hexagonal, cubic and lamellar meso(nano)structured silica, materials chemistry has moved into the realm of design and synthesis of inorganics with complex form. It becomes possible to synthesize inorganics with structural features of a few nanometers and architectures over such large length scales, up to hundreds of microns. This nanochemistry is inspiring research in materials science, solid state chemistry, semiconductor physics, biomimetics and biomaterials.

Manipulation of surfactant packing parameter, headgroup charge, co-surfactants, solvents, co-solvents and organic additives have been used to template particular nanostructures. Dimension of the pores can be tuned with angstrom precision over the size range of 20-100 Å.

It has been shown that the use of cationic surfactants in the presence of a silica precursor can result in synthesizing a variety of well-defined nanoporous silica shapes. A cationic molecule can exchange its counteranion, say chloride, with a mineralizable inorganic anion, protonated silicate. Synthesis of mesoporous thin films, spheres, curved shaped solids, tubes, rods and fibers, membranes, and other monoliths has been reported recently. See references in Y. Kievsky and I. Sokolov, "Self-Assembly of Uniform Nanoporous Silica, *IEEE Transactions on Nanotechnology*, v. 4 (5), pgs. 490-494, the entire article is hereby incorporated by reference. Despite demonstrated success of this approach, there are two problems that prevent broader use of the assembled porous shapes:
 1. Self-assembly process brings an excessive variety of the assembled shapes; and
 2. The yield of the desired shapes is far from one hundred percent.

These factors make it difficult to extract, and subsequently, to use the desired shapes.

SUMMARY

This disclosure describes a self-assembly templating of a cationic surfactant in the presence of a silica precursor that is free of an excessive variety of the assembled shapes and has a yield approaching one hundred percent. This disclosure describes a self-assembly process that includes cooling and keeping a resultant solution at temperatures that are less than typically used for the synthesis, in a particular example of 4° C.

DESCRIPTION OF THE DRAWINGS

These and other features, aspects, and advantages of the present invention will become better understood with regard to the following description, appended claims, and accompanying drawings where:

FIG. 1$a$ illustrates SEM images of the fibers assembled at the cold temperature (magnification a the horizontal bar is 11 µm);

FIG. 1$a'$ illustrates SEM images of the fibers assembled at the cold temperature (magnification a'—the horizontal bar is 11 µm);

FIG. 1$b$ illustrates SEM images of the fibers assembled at room temperature (magnification b—the horizontal bar is 11 µm);

FIG. 1$b'$ illustrates SEM images of the fibers assembled at room temperature (magnification b'—the horizontal bar is 11 µm);

FIG. 2$a$ illustrates a "Zoo" of shapes assembled at the room temperature (magnification a);

FIG. 2$a'$ illustrates a "Zoo" of shapes assembled at the room temperature (magnification a');

FIG. 2$b$ illustrates a "Zoo" of shapes assembled at the room temperature (magnification b);

FIG. 2$b'$ illustrates a "Zoo" of shapes assembled at room temperature (magnification b');

DESCRIPTION

The Method of Self-Assembly

Figure 3:
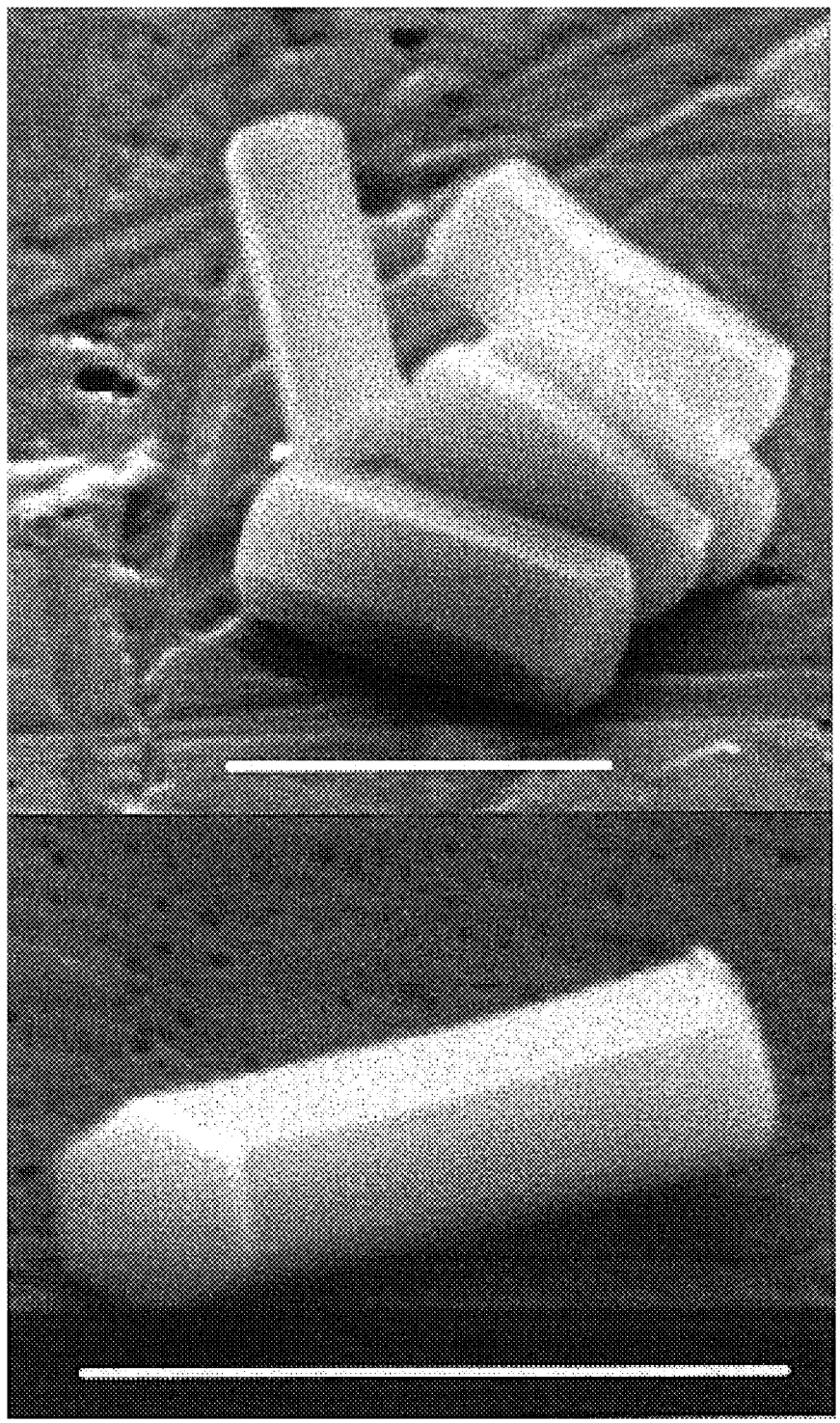
FIG. 3 illustrates higher magnification SEM images of fibers assembled in the cold synthesis—the horizontal bar is 5 µm.

The object of the invention is the self-assembly templating of a cationic surfactant in presence of a silica precursor that is free of both of the problems mentioned above.

An acidic synthesis of nanoporous silica fibers was described previously by H. Yang and G. A. Ozin, "Morphogenesis of shapes and surface patterns in mesoporous silica," Nature, vol. 386, pp. 692-695, 1997 [Yang et al], hereby incorporated by reference. Yang et al synthesized mesoporous silica bodies under quiescent aqueous acidic conditions using cetyltrimethylammonium chloride (CTACl) as surfactant template and tetraethylorthosilicate (TEOS) as silica precursor. Here we use the same ideas of liquid crystal templating and condensation of silica precursor, (for example, tetraethylorthosilicate or tetramethyorthosilicate (TMOS), "silica precursor" hereafter). Either CTACl or CTAB is used as an exemplary cationic surfactant template. The required acidity is created by means of hydrochloric, sulfuric, nitric, phosphoric or other strong acids. All chemicals are standard (used as purchased). The surfactant, acid, and either ultrapure or deionized water are mixed, stirred first at room temperature and the mixture then is cooled down to a temperature that is well below the room temperature (4° C. is used as an exemplary value) in a refrigerator for a reasonable time that can be judged by one skilled in art (15 minutes is an exemplary value). Cooled to the same cold temperature, a silica precursor is added to the acidic solution of surfactant and stirred for a reasonable time that can be judged by one skilled in art (30 seconds is used an exemplary value). The final molar ratio of the reactants is 100 $H_2O$:X HCl:Y cationic surfactant:0.13 silica precursor. Here part X ranges from approximately 7 to 11 (9 is taken an exemplary value), Y ranges from 0.05 and higher (0.22 for CTACl is taken as an exemplary value). The resulting solution is kept under then same cold temperature for a period from 1 to 24 hours, with 3 hours as an exemplary time. The material is collected by either centrifugation or filtration. The collected powder washed with pure water, dried in ambient conditions. For a number of applications it may be beneficiary to remove the surfactant from the pores. This can be done though either using various organic solvents or the process of calcination at elevated temperatures (both processes are known to one skilled in art). To amplify, the 4° C. temperature is an exemplary value, but the process will produce the expected results over range from a freezing solution temperature (depending on specific composition of the synthesizing solution) to +10° C. The 3 hour time at the cold temperature is an exemplary value, but the process will produce the described particles if cold from 1 hour to 24 hours.

To demonstrate the importance of the self-assembly in low temperatures, the synthesis process was repeated as described above, but done in room temperature (specifically 24° C.).

DESCRIPTION OF THE RESULTS

The disclosed synthesis produced:
1. A surprisingly high yield (virtually 100%) of nanoporous fibers; and
2. Synthesized fibers having a very narrow size-distribution.

A scanning electron microscope (SEM, JEOL JSM-6300) was used to characterize morphology of the synthesized particles. A thin layer of gold was spattered on the particle surface to improve the SEM contrast. The pore periodicity was found by using low-angle powder X-ray diffraction (XRD) technique (Ordela 1050X). The particle size distribution was measured by using a light-scattering technique (ALV-NIBS High Performance Particle Sizer). Gas absorption was done on a Quantochrome apparatus. Transmission Electron Microscopy (TEM, JOEL) images were collected on the particle edges; the particles were calcined in nitrogen to keep carbon inside the pores, and consequently, improve the TEM contrast.

SEM images are used to measure statistical distribution of the fiber diameters ("diameter" for a hexagonal cylinder is defined as the diameter of circumference inside the hexagonal cross-section) and lengths. To estimate the diameters of the fibers and their length, about 80 fibers were measured in the SEM images.

Using the SCM illustrates that the low-temperature synthesis results in a surprising high, virtually 100% yield, of hexagonal fibers ("yield: denotes the volume percentage of well defined shapes in the collected batch versus shapeless "junk"). FIGS. 1(a) and 1(a''') illustrate a representative SEM image of the fibers obtained in the cold synthesis, while FIGS. 1(b) and 1(b') illustrates the best part (closest to the straight fibers) of the batch synthesized at room temperature. To clearly see the difference, FIGS. 1(a') and 1(b') show a higher resolution image of the particles assembled at cold and room (best part) temperatures respectfully. The horizontal bar in FIGS. 1(a), 1(a'), 1(b), and 1(b') represents a space of 11 µm. One can see that the fibers in FIGS. 1(b) and 1(b') are not as uniform as those assembled in a cold environment as shown if FIGS. 1(a) and 1(a'). The room temperature results have a number of round shapes, discoids, and the fibers are bent. In contrast, the cold synthesis results in the shapes of only one type, almost straight fibers of a hexagonal cross section. Furthermore, the yield of the fibers synthesized at room temperature is hard to estimate due to the high variability of the shapes. FIGS. 2a, 2b, 2c and 2d illustrate a typical "zoo" of such shapes obtained at room temperature. One can see a large variety of fibers of different size including some fibers somewhat close to "haired" fibers (see FIG. 2d), which are hard to distinguish from shapeless "junk."

It needs to be stressed that there is no variation of the fibers assembled in the cold synthesis. FIG. 3 illustrates a higher magnification SEM image of fibers assembled in the cold synthesis. The hexagonal cross section of the fiber is clearly seen. The horizontal bar in FIG. 3 is 5 µm.

The SEM images in FIGS. 1(a) and 1(a') represent all of the fibers in the batch. This makes this material, an article of manufacture, very attractive for various applications as will be discussed below.

Figure 4:
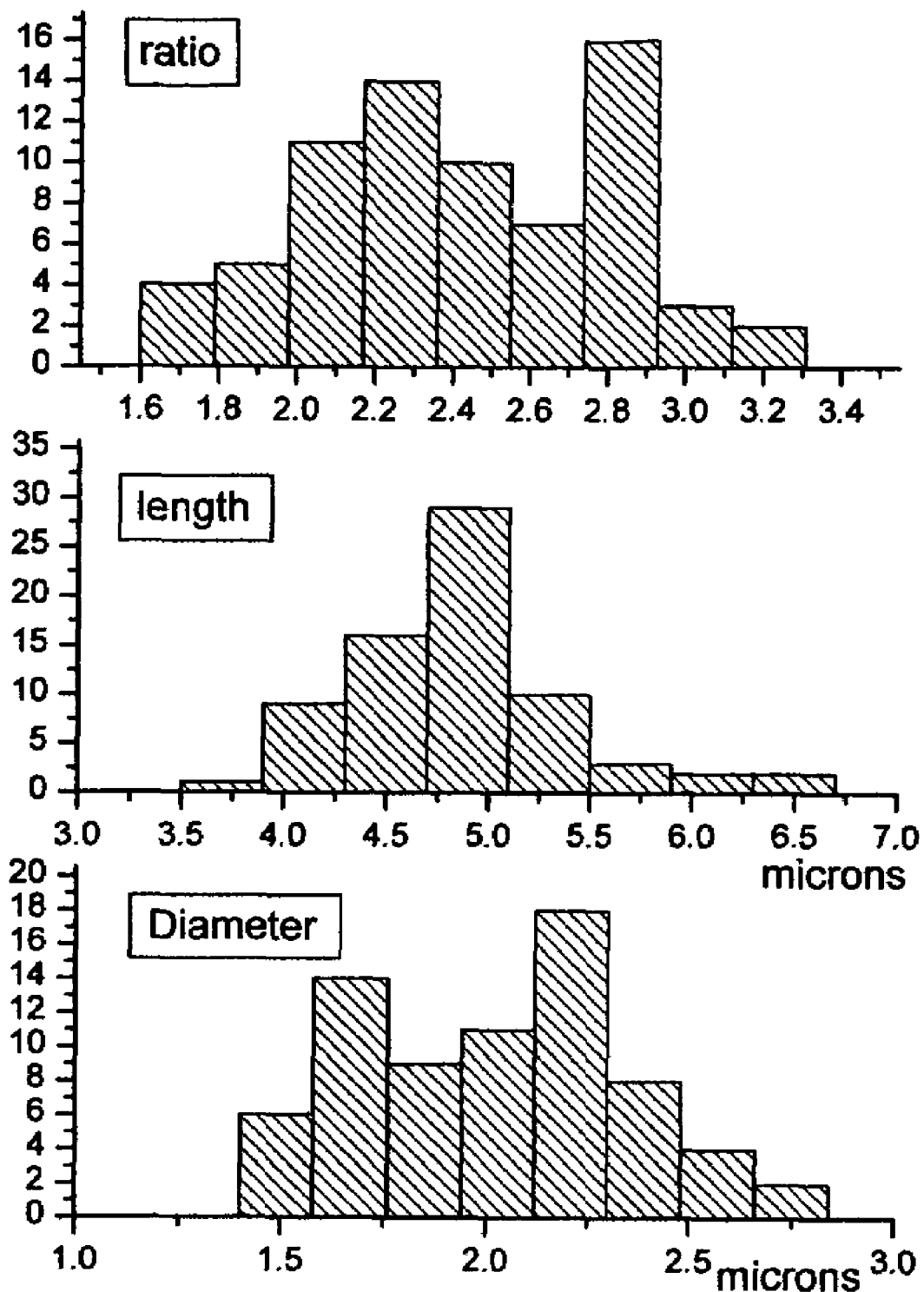
FIG. 4 illustrates the distribution of the fiber diameters, lengths and length-diameter ratio.

FIG. 4 illustrates histograms of distributions of the fiber diameter, length, and the length-diameter aspect ratio. The average diameter of the fibers is 2.0 µm (standard deviation is 0.3 µm), the average length is 4.8 µm (standard deviation is 0.5 µm), and the average aspect ratio is 2.4 (standard deviation is 0.4 µm). Based on these numbers the dispersion of the diameter, length, and the ratio are 16%, 11%, and 16%, respectively.

Figure 5:
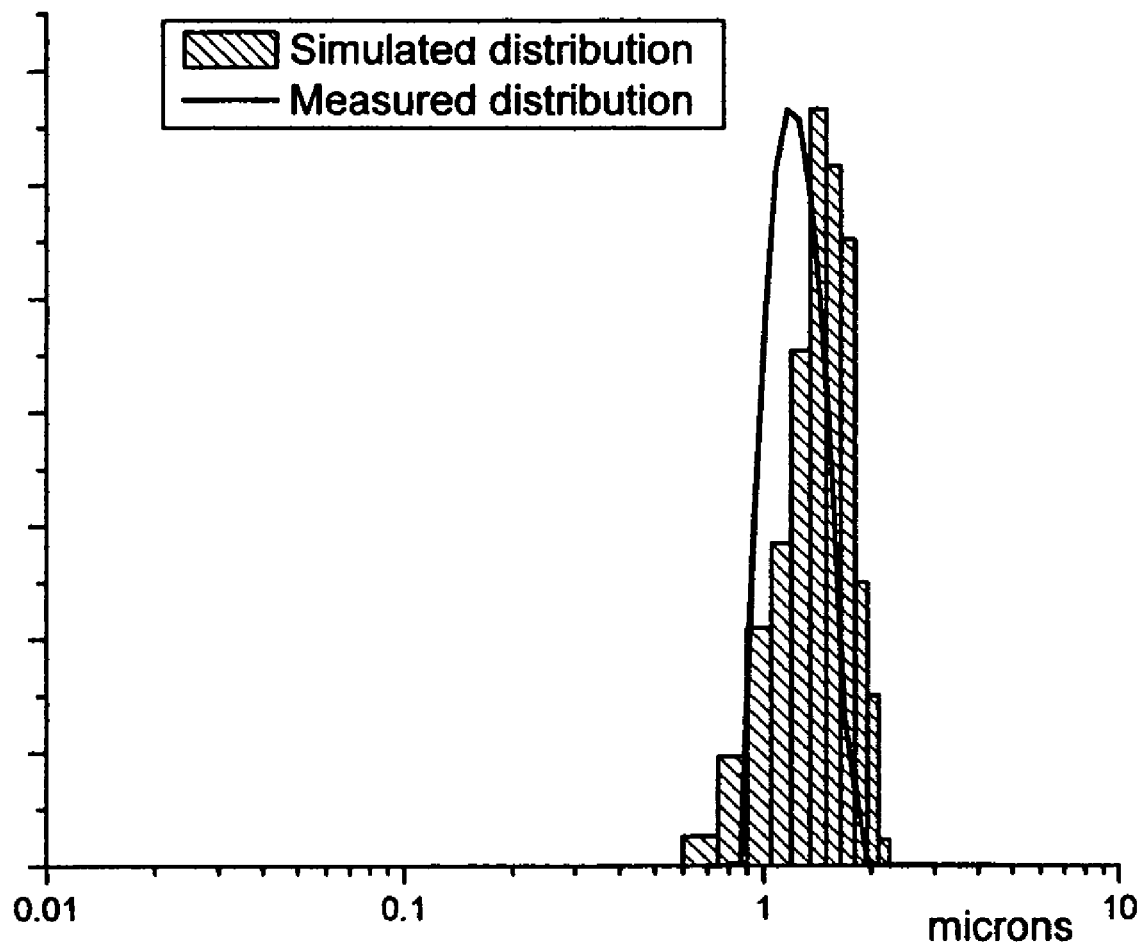
FIG. 5 illustrates distribution of the effective particle radii.

To demonstrate that the above statistics are robust, light scattering measurements were done. FIG. 5 illustrates the distribution of the effective particle radii measure by means of the light scattering. The simulated distribution (the histogram) is based on the SEM statistics. The measured distribution with the help of a light-scattering setup is shown by a solid line. The length distribution is the most important consideration for practical applications. The size distribution of the fibers was confirmed for a macroscopical number of fibers with a light scattering technique, as illustrated in FIG. 5. One can see that the distribution simulated from FIG. 4 matches closely the light scattering distribution of macroscopical number of fibers.

Figure 6:
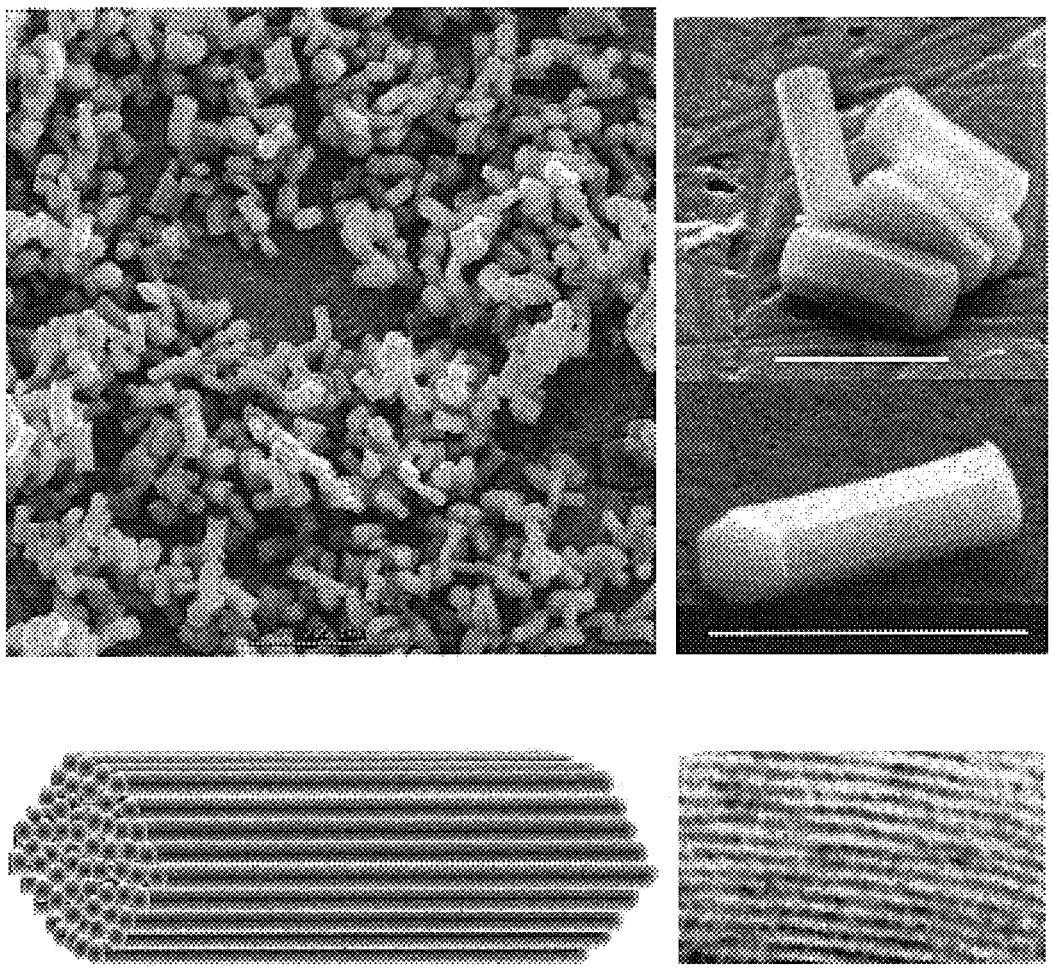
FIG. 6 illustrates SEM and TEM images of parallel nanotubes.

FIG. 6 illustrates a SEM image of parallel nanotubes in fiber like arrays of silica nanotubes (ASNT) of uniform shape. A large area (left bar size is 22 µm) and zoom to a few ANST (right bar size is 5 µm) are illustrated. In addition, FIG. 6 illustrates a schematic showing the arrangement of nanotubes and a TEM image of near the fiber edge showing the periodicity of about 3 nm. The microscopical structure of the product is illustrated in the TEM of FIG. 6.

Figure 7:
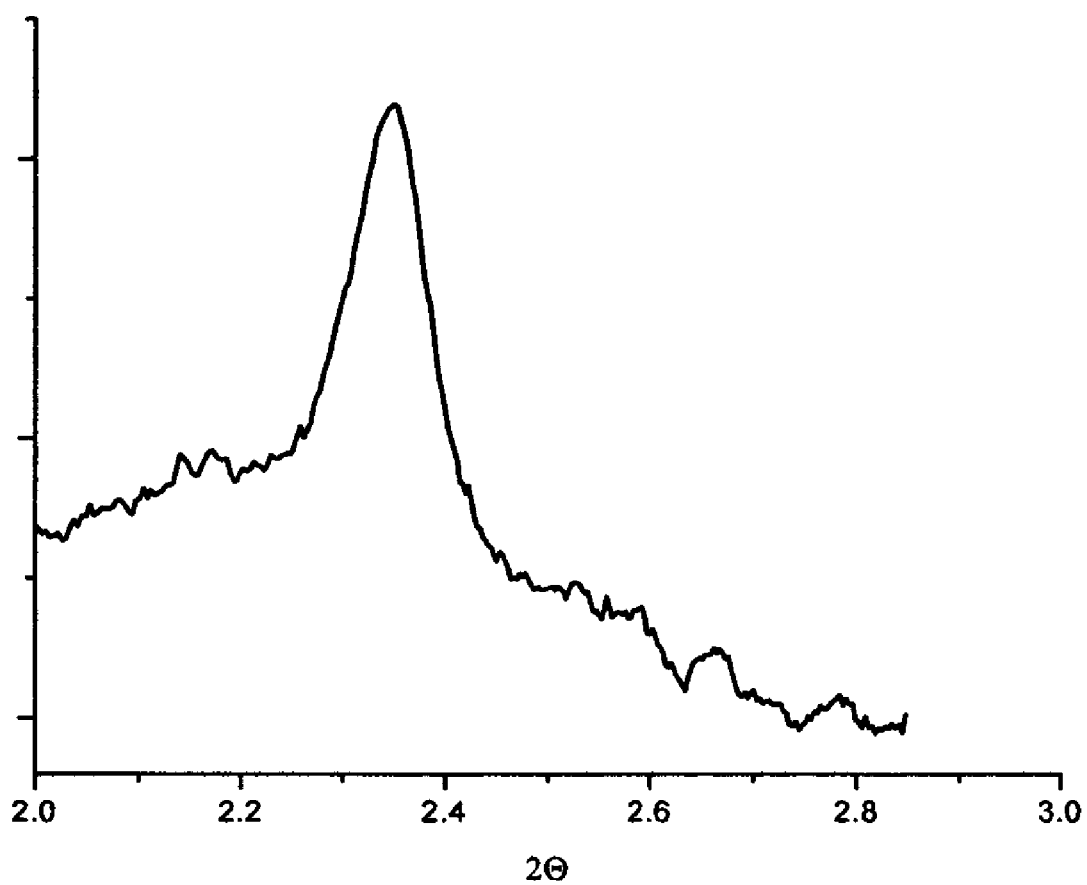
FIG. 7 illustrates low-angle powder XRD pattern of the synthesized fibers.

Statistically, the size of the periodicity can be characterized by low angle powder X-ray (SAXS) as illustrated in FIG. 7 and gas absorption (not shown) techniques. The periodicity that corresponds to maximum in FIG. 7 is 3.8 nm. From gas absorption measurements, the pore size is 3.0 nm leaving 0.8 nm for the wall thickness.

The assembled product contains fibers that have a hexagonal cross-section of ca. 2 µm and the length of ca. 4.8 µm. The highly uniform cylindrical pores with diameter of 3 nm (the wall between the pores is ~0.8 nm) are unidirectional along the fiber. The pore size can be varied by changing the length of the templating molecule. The synthesized particles can be called arrays of (closely packed) silica nanotubes (ASNT).

With their lower cost and high yield, the nanoporous silica fibers of a uniform shape produced by this cold temperature technique, create many possible applications. Uniformity in distribution means uniformity of properties. Therefore, the use of the assembled shapes will have advantages in any areas in which such properties are desirable. The area where the uniformity is required includes, but is not limited to:

1. Filtering applications for chromatography;
2. More non-trivial use of these shapes would be in drug delivery; Well controlled shapes will allow reliably controlled drug release by diffusion out through the pores; When taking the inside of the organism, silica has a serious advantage by being a chemically resistive and biocompatible for oral application;
3. Uniform silica shapes will allow assembly of various types of nanowires in their pores of uniform length; This characteristic can be used for magnetic and gas sensors;
4. 3D catalysts; some chemical reaction can be done in the confined space inside the channels;
5. Storage of biomolecules for extension of their life time (can also be used in biosensors); and
6. A 3D matrix for quantum dots.

These synthesized particles have significant broader applications as well. The problem of how to "package" nanodots, carbon nanotubes, fullerenes, and other popular nano objects into larger scale devices is one of the most important problems of modern nanotechnology. The self-assembly of nano objects into larger functional shaped devices is a very attractive way of addressing this problem because of its intrinsic simplicity and low-cost. An ultimate example of such hierarchical self-assembly exists already in the world of biological objects. While rational design of bio objects is definitely not a readily feasible task at the present, an example of such a hierarchical self-assembly is already well-known. This hierarchical self-assembly is the co-assembly of organic liquid crystals with an inorganic precursor of some metal oxides, in particular, silica. In some specific conditions such a synthesis can result in the assembly of complex shapes, which resemble the shapes typically found in the biological world. These materials are in a prime position to be used in a broad variety of applications. The major obstacle here is a broad polydispersity of the synthesized arrays-shapes.

The method of self-assembly of nanoporous silica fibers of uniform shape presented here is the first indication that hierarchical self-assembly can be used for controllable "mass-manufacturing" of larger nanostructured objects.

The illustrative embodiments and modifications thereto described hereinabove are merely exemplary. It is understood that other modifications to the illustrative embodiments will readily occur to persons of ordinary skill in the art. All such modifications and variations are deemed to be within the scope and spirit of the present invention as will be defined by the accompanying claims.

We claim:

1. A method of self-assembly of uniform nanoporous silica fibers comprising:

liquid crystal templating and condensing a silica precursor using a cationic surfactant template;

adding an acid to said surfactant, said acid selected from the group consisting of hydrochloric, nitric, phosphoric, and sulphuric and other strong acids to achieve a required molar ratio;

mixing said surfactant, said cationic surfactant template, said acid and either ultrapure or deionized water by stirring at room temperature for approximately one minute creating a first mixture;

cooling said first mixture down to a cold temperature from a freezing solution temperature to +10° C., for a first time, approximately 15 minutes, creating a first mixture;

adding a silica precursor cooled to said cold temperature to said first mixture, creating a second mixture;

stirring said second mixture for a second time, approximately 30 seconds;

keeping said second mixture under said cold temperature for a third time, greater than 1 hour;

collecting nanoporous silica fiber powder by either centrifugation or filtration;

washing said collected powder with pure water; and drying said collected powder, wherein a final molar ratio of reactants is 100 for $H_2O$:; X for HCl:; Y for said cationic surfactant template:; 0.13 for said silica precursor, further wherein X is 7 to 11 and Y is 0.05 or higher.

2. The method of claim 1 wherein said cold temperature is between −10° C. and +10° C.

3. The method of claim 1 wherein said cold temperature is 40° C.

4. The method of claim 1 wherein said third time is between greater than 1 hour and 24 hours.

5. The method of claim 1 wherein said third time is 3 hours.

6. The method of claim 1 wherein X is 9.

7. The method of claim 1 wherein a value of Y is 0.22.

8. The method of claim 1 further comprising:

removing surfactant from pores of said powder.

9. The method of claim 1, wherein said powder contains fibers having a hexagonal cross-section of about 2 μm and a length of about 4.8 μm.

10. The method of claim 1, wherein said powder contains fibers having highly uniform densely packed cylindrical pores (unidirectional along the fiber) with a diameter of 3 nm and having a minimum wall thickness between said cylindrical pores of about 0.8 nm.

11. The method as in any of the preceding claims in which said nanoporous silica fibers have a uniform shape of the assembled shapes and have a yield approaching one hundred percent.

12. A method of self-assembly of uniform nanoporous silica fibers comprising:

liquid crystal templating and condensing a silica precursor using a cationic surfactant template;

adding hydrochloric acid to achieve a required acidity, to achieve a required molar ratio;

mixing said surfactant, said acid and either ultrapure or deionized water by stirring at room temperature for approximately one minute creating a first mixture;

cooling said first mixture down to a temperature from −10° C. to +10° C., a cool temperature for a first time, approximately 15 minutes;

adding a silica precursor, cooled to said cool temperature, to said first mixture, creating a second mixture;

stirring said second mixture for a second time, approximately 30 seconds;

keeping said second mixture under said cool temperature for a third time, 1 to 24 hours;

collecting nanoporous silica fiber powder by either centrifugation or filtration;

washing collected powder with pure water; and drying said powder drying said collected powder, wherein a final molar ratio of reactants is 100 for $H_2O$:; X for HCl:; Y for said cationic surfactant template:; 0.13 for said silica precursor, further wherein X is 7 to 11 and Y is 0.05 or higher.

13. The method of claim 12 wherein said cool temperature is approximately +4° C.

14. The method of claim 12 wherein said third time is approximately 3 hours.

15. The method of claim 12 further comprising:
removing surfactant from pores of said powder.

16. The method of claim 12, wherein said powder contains fibers having a hexagonal cross-section of about 2 μm and a length of about 4.8 μm.

17. The method of claim 12, wherein said powder contains fibers having highly uniform densely packed cylindrical pores (unidirectional along the fiber) with a diameter of 3 nm and having a minimum wall thickness between said cylindrical pores of about 0.8 nm.

18. The method as in any of the preceding claims in which said nanoporous silica fibers have a uniform shape of the assembled shapes and have a yield approaching one hundred percent.

* * * * *